(12) United States Patent
Hong

(10) Patent No.: US 6,876,418 B2
(45) Date of Patent: Apr. 5, 2005

(54) LIQUID CRYSTAL DISPLAY DEVICE HAVING WIDE VIEWING ANGLES AND METHOD OF FABRICATING THE SAME

(75) Inventor: Hyung-Ki Hong, Seoul (KR)

(73) Assignee: LG. Phillips LCD Co., Ltd., Seoul (KR)

( * ) Notice: Subject to any disclaimer, the term of this patent is extended or adjusted under 35 U.S.C. 154(b) by 29 days.

(21) Appl. No.: 10/667,311

(22) Filed: Sep. 23, 2003

(65) Prior Publication Data

US 2004/0057000 A1 Mar. 25, 2004

(30) Foreign Application Priority Data

Sep. 23, 2002 (KR) .................................. 10-2002-0057648

(51) Int. Cl.[7] ...................... G02F 1/1337; G02F 1/136; G02F 1/1335
(52) U.S. Cl. .......................... 349/129; 349/48; 349/96; 349/117; 349/119
(58) Field of Search .............................. 349/42, 48, 96, 349/110, 117, 119, 123, 129

(56) References Cited

U.S. PATENT DOCUMENTS

| | | | |
|---|---|---|---|
| 6,169,590 B1 * | 1/2001 | Abileah et al. ............. | 349/120 |
| 6,603,523 B2 * | 8/2003 | Nakamura et al. .......... | 349/119 |
| 6,784,963 B2 * | 8/2004 | Park ........................... | 349/129 |
| 2004/0125295 A1 * | 7/2004 | Kim et al. ................... | 349/129 |

OTHER PUBLICATIONS

W.C. Yip, et al. *IMDC*. "Photo–induced alignment technologies for AMLCD manufacturing." 2002, p. 147.

\* cited by examiner

*Primary Examiner*—Tarifur R. Chowdhury
(74) *Attorney, Agent, or Firm*—Morgan Lewis & Bockius LLP

(57) ABSTRACT

A liquid crystal display (LCD) device includes a first substrate having at least one pixel region and a black matrix, a common electrode beneath the first substrate, a first alignment layer beneath the common electrode, a first linear polarizer along an outer side surface of the first substrate, a second substrate having at least one pixel portion corresponding to the pixel region of the first substrate, the pixel portion being divided into first and second areas, gate and data lines provided on both the first and second areas of the second substrate, the gate and data lines crossing each other, a first switching element provided at a cross point of the gate and data lines within the first area, a second switching element formed at a cross point of the gate and data lines within the second area, a first pixel electrode within the first area connected to the first switching element, a second pixel electrode within the second area connected to the second switching element, a first retardation layer having a first phase retardation value formed beneath the first pixel electrode, a second retardation layer having a second phase retardation value different from the first phase retardation value formed beneath the second pixel electrode, a second alignment layer provided on the first and second pixel electrodes, a liquid crystal layer disposed between the first and second alignment layers, and a second linear polarizer provided along an outer side surface of the second substrate.

42 Claims, 9 Drawing Sheets

LIQUID CRYSTAL DISPLAY DEVICE HAVING WIDE VIEWING ANGLES AND METHOD OF FABRICATING THE SAME

The present invention claims the benefit of Korean Patent Application No. 2002-57648 filed on Sep. 23, 2002 in Korea, which is hereby incorporated by reference.

BACKGROUND OF THE INVENTION

1. Field of the Invention

The present invention relates to a liquid crystal display (LCD) device and a method fabricating a liquid crystal display device, and more particularly, to a liquid crystal display (LCD) device having wide viewing angles.

2. Discussion of the Related Art

In general, liquid crystal display (LCD) devices utilize properties of liquid crystals, such as optical anisotropy and polarity, in order to display images. Since the liquid crystal molecules have a long thin structure and an alignment orientation, alignment of the liquid crystal molecules can be controlled by application of an electric field to the liquid crystals. Accordingly, the images can be displayed by changing the alignment of the liquid crystal molecules, thereby modulating light that is polarized by the optical anisotropy of the liquid crystals. Currently, active matrix liquid crystal display (AM-LCD) devices, which have thin film transistors and pixel electrodes arranged in a matrix configuration, are being developed to have high resolution and an ability to display moving images. The basic structure of a liquid crystal display panel will be described hereinafter with reference to FIG. 1.

FIG. 1 is a perspective view of a TN mode liquid crystal display (LCD) device according to the related art. In FIG. 1, a liquid crystal display panel 11 for displaying color images includes upper and lower substrates 5 and 22, wherein a liquid crystal material 14 is injected into a space between the upper and lower substrates 5 and 22. The upper substrate 5 includes a color filter 7 having a black matrix 6, a plurality of sub-color filters red (R), green (G), and blue (B), and a common electrode 18 formed on the color filter 7. The lower substrate 22 includes a plurality of pixel regions "P," wherein each pixel region "P" includes a pixel electrode 17 and a thin film transistor "T."

The lower substrate 22 is commonly referred to as an array substrate such that the thin film transistors "T" are arranged in a matrix configuration and a plurality of gate and data lines 13 and 15 are electrically connected to the thin film transistors "T." In addition, the pixel region "P" is defined by a crossing of the gate and data lines 13 and 15. The pixel electrode 17 formed within the pixel region "P" is commonly formed of transparent conductive material, such as indium tin oxide (ITO).

The LCD device displays images by aligning the liquid crystal material 14 by application of a signal from the thin film transistor "T." Thus, an amount of transmitted light is controlled according to the alignment of the liquid crystal material 14. Since the LCD device has the common electrode 18 formed on the upper substrate 5, the liquid crystals are aligned by an electric field that is formed vertically with the upper and lower substrates 5 and 22. Accordingly, the LCD device has a high transmittance and a large aperture ratio. In addition, since the common electrode 18 is formed on the upper substrate 5 and functions as a grounding conductor, the LCD device can be safe from static electricity discharge.

FIGS. 2A and 2B are partial schematic cross sectional views of a TN mode liquid crystal display (LCD) panel according to the related art. FIG. 2A demonstrates an alignment of a TN mode liquid crystal when a voltage is not supplied to the liquid crystal panel. Accordingly, a liquid crystal 14 has a positive dielectric anisotropy and has a horizontal alignment in which liquid crystal molecules are twisted to have an angle of 90° (degrees) between the liquid crystal molecule adjacent to the upper substrate 5 and the liquid crystal molecule adjacent to the lower substrate 22.

FIG. 2B demonstrates an alignment of the liquid crystal 14 when a voltage is supplied to the liquid crystal display panel. Accordingly, the twisted liquid crystal molecules 14 become re-aligned parallel to an electric field direction when the voltage is supplied to the upper and lower substrates 5 and 22. Thus, since both contrast ratio (C/R) and luminance significantly change according to a viewing angle, a wide viewing angle cannot be achieved. To overcome the problem, the pixel is divided into a normally-white mode region and a normally-black mode region, and a set of polarizers having a vertical polarizing axis to each other are formed for each region. Accordingly, the wide viewing angle of the liquid crystal display panel can be achieved by independently supplying voltages to each region for multi-compensation of the luminance.

FIG. 3 is a schematic cross sectional view of a liquid crystal display panel having a wide viewing angle according to the related art. In FIG. 3, a nematic liquid crystal layer 60 that has a twisted angle of 90° (degrees) is disposed between first and second substrates 40 and 50. A first linear polarizer 42 is formed on the first substrate 40, and second and third linear polarizers 52 and 56 are formed between the second substrate 50 and the liquid crystal layer 60. A polarizing axis of the second polarizer 52 is parallel with a polarizing axis of the first polarizer 42, and a polarizing axis of the third polarizer 56 is perpendicular to a polarizing axis of the first polarizer 42, wherein the second and third polarizers 52 and 56 are formed within a pixel region "P." A first one-half of the pixel region "P" is defined as a normally-black mode region (NB) "A" and a second one-half of the pixel region "P" is defined as a normally-white mode region "B." Accordingly, the second polarizer 52 corresponds to the normally-black mode region "A" and the third polarizer 56 corresponds to the normally-white mode region "B."

FIG. 4 is a schematic plan view of FIG. 3 according to the related art. In FIG. 4, liquid crystal molecules 60a in the normally-black mode region "A" and liquid crystal molecules 60b in the normally-white mode region "B" each have twisted structures with a twist angle of 90° (degrees) when the voltage is not supplied. Accordingly, light is linearly polarized when it passes through an upper polarizer 42a, wherein a polarizing direction of the light rotates 90° (degrees) after passing through the TN mode liquid crystal. Thus, the light is intercepted within the normally-black mode region "A" where the polarizing axis of a lower polarizer 52a is parallel with the polarizing axis of the upper polarizer 42a. Moreover, the light is transmitted within the normally-white mode region "B" where the polarizing axis of a lower polarizer 56a is perpendicular to the polarizing axis of the upper polarizer 42a. As a result, the normally-black mode region "A" generates a black state and the normally-white mode region "B" generates a white state when the voltage is not supplied. Therefore, if different voltages are supplied to the normally-black mode region "A" and the normally-white mode region "B", an average luminance value of the normally-black mode region "A" and the normally-white mode region "B" becomes a gray level and a wider viewing angle can be acquired.

FIGS. 5A to 5C are graphs demonstrating viewing angle properties of a liquid crystal display (LCD) panel having a wide viewing angle according to the related art. FIG. 5A demonstrates viewing angle properties of a liquid crystal display panel operated in a black state. In FIG. 5A, a graph portion 60 corresponds to a black state at the normally-black mode region, a graph portion 62 corresponds to a black state at the normally-white mode region, and a graph portion 64 corresponds to a black state at both the normally-black mode region and the normally-white mode region. When the black mode is at the normally-black mode region, a measured luminance is close to zero within a range of designated viewing angles between −80° (degrees) and +80° (degrees). On the other hand, when the black state is at the normally-white mode region, luminance increases as the viewing angle increases along upward and downward directions. Accordingly, from the graph portion 64, luminance is lower than the luminance of the black state at the normally-white mode region. Thus, the liquid crystal display panel having the normally-black mode region and the normally-white mode region within one pixel region can display clearer dark images than a liquid crystal display panel having only a normally-white mode region within a pixel region.

FIG. 5B demonstrates viewing angle properties of a liquid crystal display panel operated in a middle gray state. In FIG. 5B, a graph portion 70 corresponds to a luminance property of the normally-black mode region, a graph portion 72 corresponds to a luminance property of the normally-white mode region, and graph portion 74 corresponds to a luminance property of the normally-black mode region and the normally-white mode region, each within a range of designated viewing angles. As shown in FIG. 5B, the graph portions 70 and 72 are symmetric to each other about a vertical axis. Accordingly, each of the graph portions 70 and 72 shows significant luminance differences between a positive viewing angle region and a negative viewing angle region. Thus, luminance distribution on the liquid crystal display panel is not uniform. However, the graph portion 74 shows a uniform luminance property within the range of designated viewing angles. This is a result of mutual luminance compensation of the normally-black mode region and the normally-white mode region. Accordingly, gray inversion does not occur in a wide range of viewing angles.

FIG. 5C demonstrates viewing angle properties of a liquid crystal display panel operated in a white state. In FIG. 5C, a graph portion 80 corresponds to a normally-black mode region, a graph portion 82 illustrates corresponds to a normally-white mode region, and a graph portion 84 corresponds to a normally-black mode region and a normally-white mode region, each within a range of designated viewing angles. As shown in the graph portion 80, luminance abruptly decreases as the viewing angle increases along both positive and negative directions. In the graph portion 82, luminance is relatively uniform within a wide range of viewing angles. Accordingly, as shown in the graph portion 84, if the normally-black mode region and the normally-white mode region are formed within a pixel region, a relatively uniform luminance distribution can be obtained. Thus, if the normally-black mode region and the normally-white mode region are simultaneously formed within a single pixel region, a wider viewing angle can be acquired as compared to the liquid crystal display panel operated only with the normally-black mode region within a pixel region.

Accordingly, wide viewing angles can be obtained by forming a normally-black mode region and a normally-white mode region to provide mutual luminance compensation.

SUMMARY OF THE INVENTION

Accordingly, the present invention is directed to a liquid crystal display device having wide viewing angles and a method of fabricating a liquid crystal display device that substantially obviates one or more of the problems due to limitations and disadvantages of the related art.

An object of the present invention is to provide a liquid crystal display device having wide viewing angles.

Another object of the present invention is to provide a method of fabricating a liquid crystal display device having wide viewing angles.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device includes a first substrate having at least one pixel region defined thereon and a black matrix along a boundary region of the pixel region, a common electrode beneath the first substrate upon which the black matrix is formed, a first alignment layer beneath the common electrode, a first linear polarizer along an outer side surface of the first substrate, a second substrate having at least one pixel portion corresponding to the pixel region of the first substrate, the pixel portion being divided into first and second areas, gate and data lines provided on both the first and second areas of the second substrate, the gate and data lines crossing each other, a first switching element provided at a cross point of the gate and data lines within the first area, a second switching element formed at a cross point of the gate and data lines within the second area, a first pixel electrode within the first area connected to the first switching element, a second pixel electrode within the second area connected to the second switching element, a first retardation layer having a first phase retardation value formed beneath the first pixel electrode, a second retardation layer having a second phase retardation value different from the first phase retardation value formed beneath the second pixel electrode, a second alignment layer provided on the first and second pixel electrodes, a liquid crystal layer disposed between the first and second alignment layers, and a second linear polarizer provided along an outer side surface of the second substrate.

In another aspect, a liquid crystal display (LCD) device includes a first substrate having at least one pixel region defined thereon and a black matrix along a boundary region of the pixel region, first and second retardation layers beneath the first substrate, the first and second retardation layers each having different phase retardation values, a common electrode beneath the first and second retardation layers, a first alignment layer beneath the common electrode, a first linear polarizer along an outer side surface of the first substrate, a second substrate having a pixel portion corresponding to the pixel region of the first substrate, the pixel portion divided into first and second areas, the first area corresponding to the first retardation layer and the second area corresponding to the second retardation layer, gate and data lines provided on the first and second areas of the second substrate, first and second switching elements provided at crossing points of the gate and data lines of the first and second areas, first and second pixel electrodes on the second substrate, the first pixel electrode connected to the first switching element and the second pixel electrode connected to the second switching element, a second alignment layer on the first and second pixel electrodes, a liquid crystal layer disposed between the first and second alignment layers, and a second linear polarizer provided along an outer side surface of the second substrate.

In another aspect, a method of fabricating a liquid crystal display (LCD) device includes forming a black matrix on a first substrate along a boundary region of at least one pixel region defined thereon, forming a common electrode beneath the first substrate upon which the black matrix is formed, forming a first alignment layer beneath the common electrode, forming a first linear polarizer along an outer side surface of the first substrate, providing a second substrate having at least one pixel portion corresponding to the pixel region of the first substrate, the pixel portion being divided into first and second areas, forming gate and data lines on both the first and second areas of the second substrate, the gate and data lines crossing each other, forming a first switching element at a cross point of the gate and data lines within the first area, forming a second switching element at a cross point of the gate and data lines within the second area, forming a first pixel electrode within the first area to be connected to the first switching element, forming a second pixel electrode within the second area to be connected to the second switching element, forming a first retardation layer having a first phase retardation value beneath the first pixel electrode, forming a second retardation layer having a second phase retardation value different from the first phase retardation value beneath the second pixel electrode, forming a second alignment layer on the first and second pixel electrodes, providing a liquid crystal layer disposed between the first and second alignment layers, and forming a second linear polarizer along an outer side surface of the second substrate.

In another aspect, a method of fabricating a liquid crystal display (LCD) device includes forming a black matrix on a first substrate along a boundary region of at least one pixel region, forming first and second retardation layers beneath the first substrate, the first and second retardation layers each having different phase retardation values, forming a common electrode beneath the first and second retardation layers, forming a first alignment layer beneath the common electrode, forming a first linear polarizer along an outer side surface of the first substrate, providing a second substrate having a pixel portion corresponding to the pixel region of the first substrate, the pixel portion divided into first and second areas, the first area corresponding to the first retardation layer and the second area corresponding to the second retardation layer, forming gate and data lines on the first and second areas of the second substrate, forming first and second switching elements at crossing points of the gate and data lines of the first and second areas, forming first and second pixel electrodes on the second substrate, the first pixel electrode connected to the first switching element and the second pixel electrode connected to the second switching element, forming a second alignment layer on the first and second pixel electrodes, providing a liquid crystal layer between the first and second alignment layers, and forming a second linear polarizer along an outer side surface of the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiment of the present invention, which is illustrated in the accompanying drawings.

Figure 1:
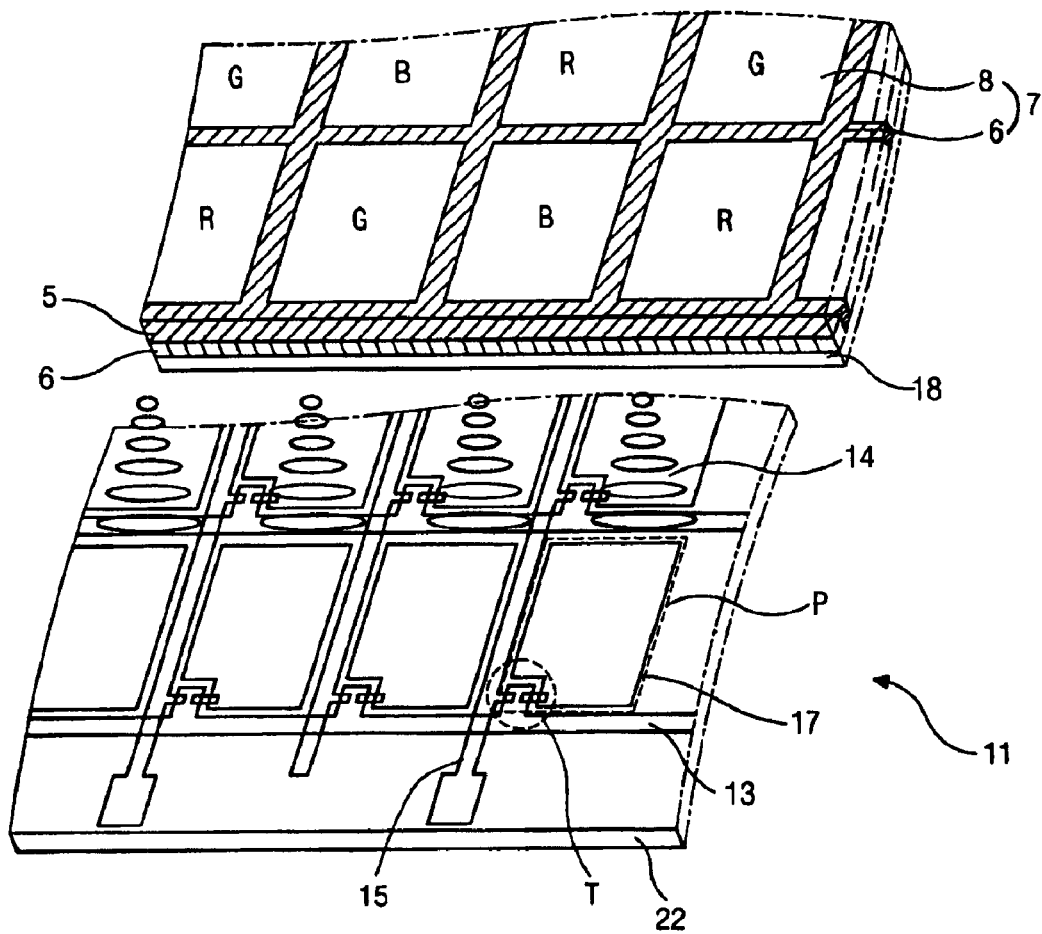
FIG. 1 is a perspective view of a TN mode liquid crystal display (LCD) device according to the related art.
Figure 2A:
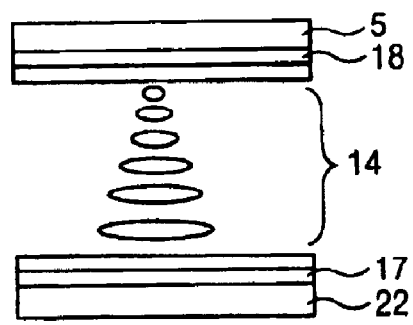
FIGS. 2A and 2B are partial schematic cross sectional views of a TN mode liquid crystal display (LCD) panel according to the related art.
Figure 2B:
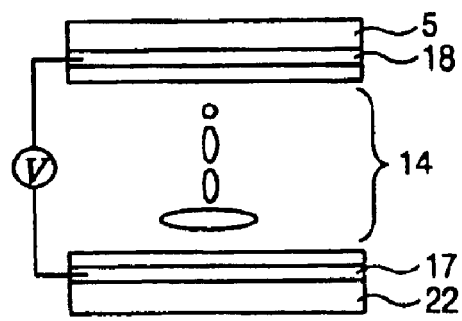
Figure 3:
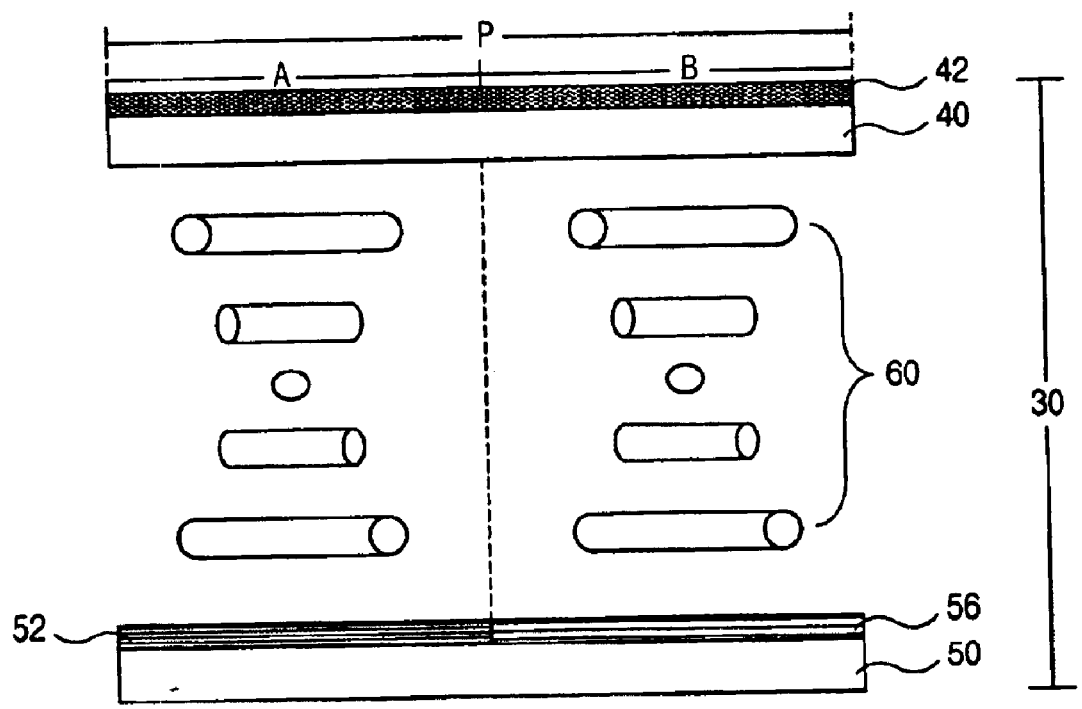
FIG. 3 is a schematic cross sectional view of a liquid crystal display panel having a wide viewing angle according to the related art.
Figure 4:
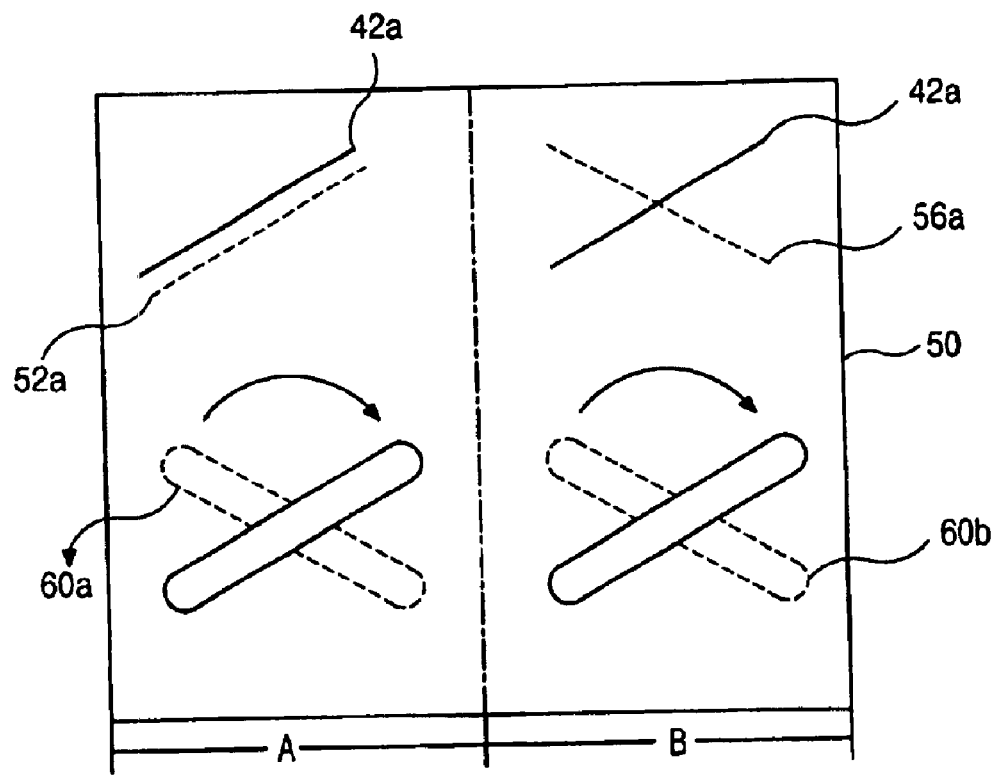
FIG. 4 is a schematic plan view of FIG. 3 according to the related art.
Figure 5A:
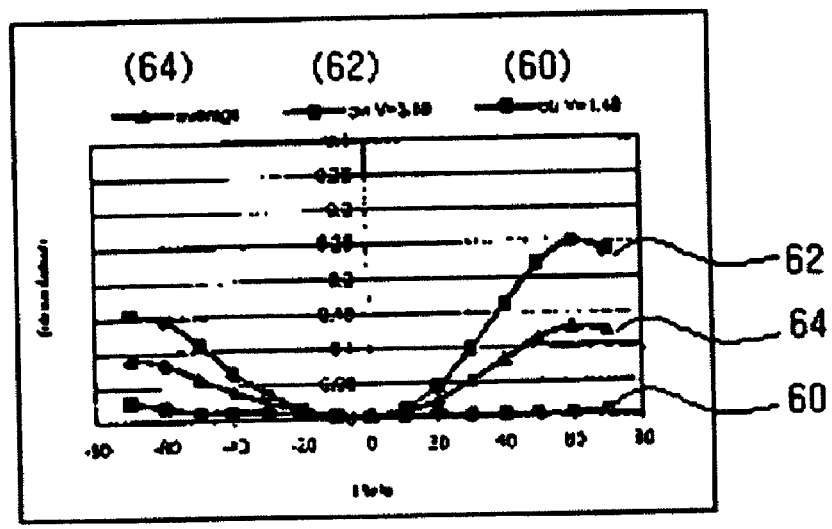
FIGS. 5A to 5C are graphs demonstrating viewing angle properties of a liquid crystal display (LCD) panel having a wide viewing angle according to the related art.
Figure 5B:
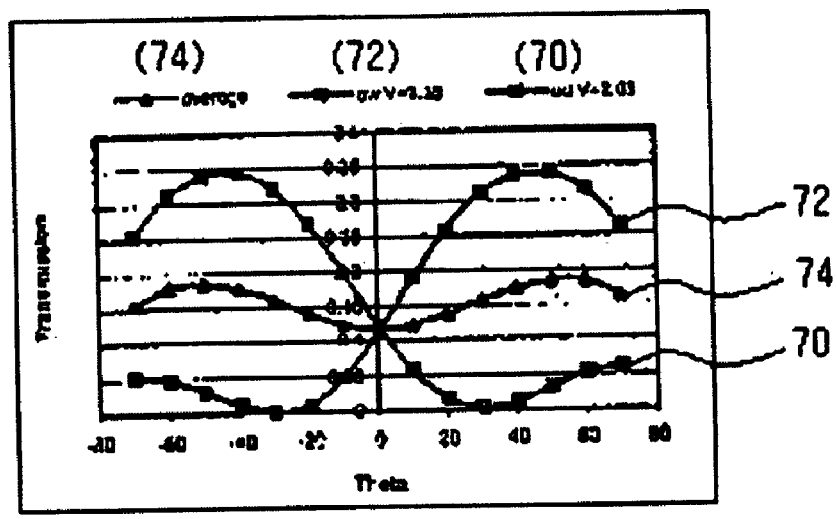
Figure 5C:
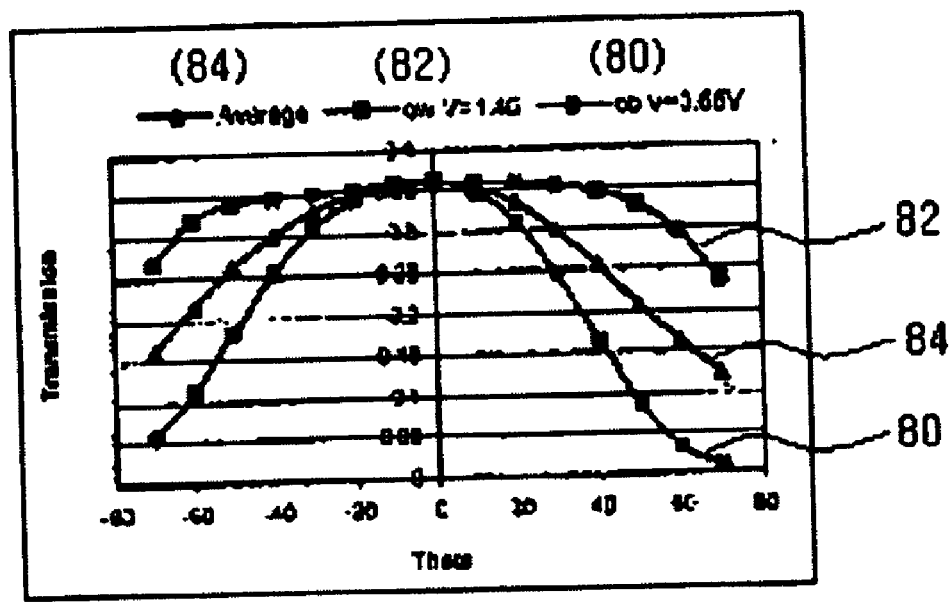
Figure 6A:
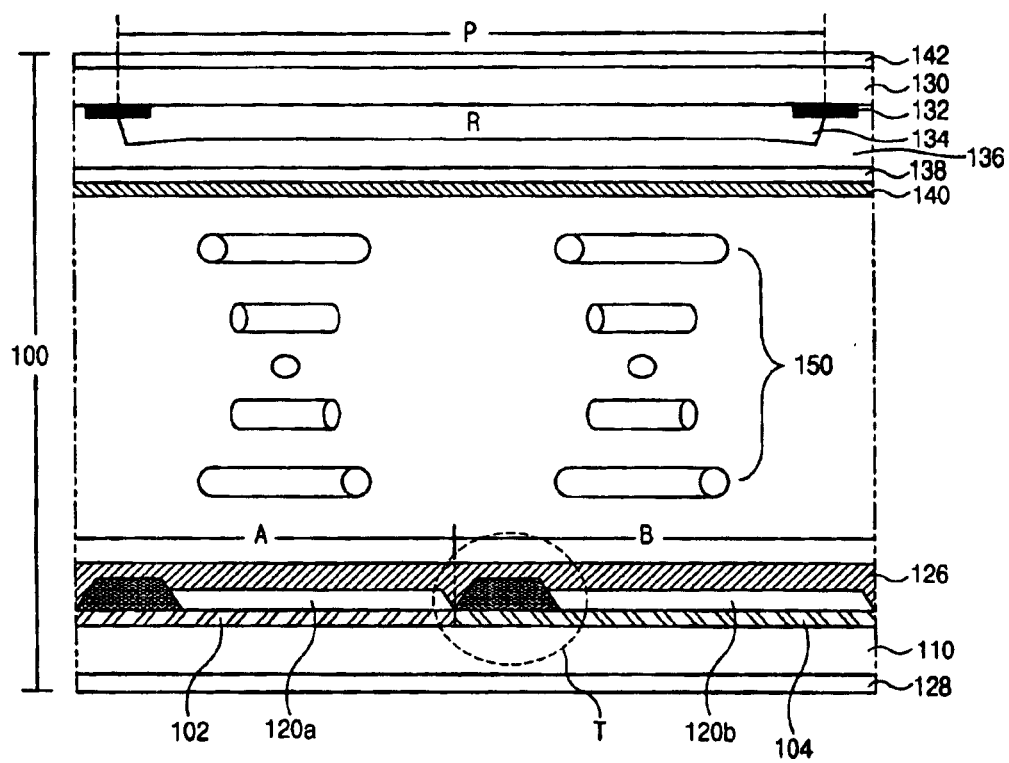
FIG. 6A is a cross sectional view of an exemplary liquid crystal display device according to the present invention.
Figure 6B:
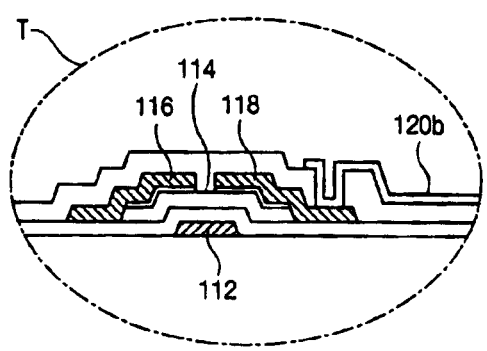
FIG. 6B is an enlarged cross sectional view of region "T" of FIG. 6A according to the present invention.

FIG. 6A is a cross sectional view of an exemplary liquid crystal display device according to the present invention, and FIG. 6B is an enlarged cross sectional view of region "T" of FIG. 6A according to the present invention. In FIG. 6A, a liquid crystal display panel 100 may include first and second substrates 110 and 130, and a liquid crystal layer 150 disposed therebetween, wherein a plurality of pixel regions "P" may be formed on the liquid crystal display panel 100. The second substrate 130 may include a black matrix 132, a sub-color filter 134, a flattening layer 136, a common electrode 138, and a second alignment layer 140. The black matrix 132 may be provided within a boundary region of each of the pixel regions "P" and the sub-color filter 134 corresponding to the pixel region "P." The flattening layer 136 may be formed on an entire surface of the second substrate 130 upon which the black matrix 132 and the sub-color filter 134 may have been already provided. The common electrode 138 may be provided beneath the flattening layer 136, and the second alignment layer 140 may be provided beneath the common electrode 138.

A portion of the first substrate 110 corresponding to the pixel region "P" may be divided into first and second areas "A" and "B." First and second retardation layers 102 and 104 may be provided within the first and second areas "A" and "B," respectively. Although not shown, gate and data lines crossing each other may be independently formed within each of the first and second areas "A" and "B." In addition, thin film transistors "T" may be provided at regions adjacent to crossing points of the gate and data lines (not shown).

In FIG. 6B, the thin film transistor "T" may include a gate electrode 112 connected to the gate line (not shown), an active layer 114, a source electrode 116 connected to the data line (not shown), and a drain electrode 118 spaced apart from the source electrode 116. In addition, first and second pixel electrodes 120a (in FIG. 6A) and 120b may be provided within the first and second areas "A" and "B," respectively, and may be electrically connected to the drain electrodes 118 of each of the thin film transistors. The liquid crystal layer 150 (in FIG. 6A) may include liquid crystal material, such as twisted nematic (TN) mode liquid crystal or electrically controlled birefringence (ECB) mode liquid crystal material, that aligns horizontally with an electric field when voltage is supplied to the common and the first and second pixel electrodes 130 and 120a and 120b. For example, when the TN mode liquid crystal material is used for the liquid crystal layer 150, the first retardation layer 102 may be formed to have a phase retardation value of about zero to cause the first area "A" to become a normally-white mode and the second retardation layer 104 may be formed to have a phase retardation value of about $\lambda/2$ to cause the second area "B" to become a normally-black mode. In addition, the phase retardation values of the first and second retardation layers 102 and 104 may be differently controlled in each pixel for red (R), green (G), and blue (B) colors. Moreover, when ECB mode liquid crystal material is used for the liquid crystal layer 150, the phase retardation value of the first retardation layer 102 may be between about 20 nm and about 50 nm, and the phase retardation value of the second retardation layer 104 may be about $\lambda/2$.

In FIG. 6A, a first alignment layer 126 may be formed along an entire surface of the first substrate 110 upon which the first and second retardation layers 102 and 104 may have been previously formed. In addition, first and second linear polarizers 128 and 142 may be formed along outer side surfaces of the first and second substrates 110 and 130, respectively, wherein a polarizing axis of the first linear polarizer 128 may be perpendicular to a polarizing axis of the second linear polarizer 142. For example, the polarizing axis of the first linear polarizer 128 may have a polarizing angle of about 135° (degrees) and the polarizing axis of the second linear polarizer 142 may have a polarizing angle of about 45° (degrees). Moreover, different voltages may be supplied to the normally-white mode region "A" and the normally-black mode region "B". Thus, a color shift phenomenon that commonly increases as the viewing angles increase may be reduced by a mutual luminance compensation between the normally-white mode region "A" and the normally-black mode region "B." Therefore, a liquid crystal display device having wide viewing angles may be obtained.

Figure 7A:
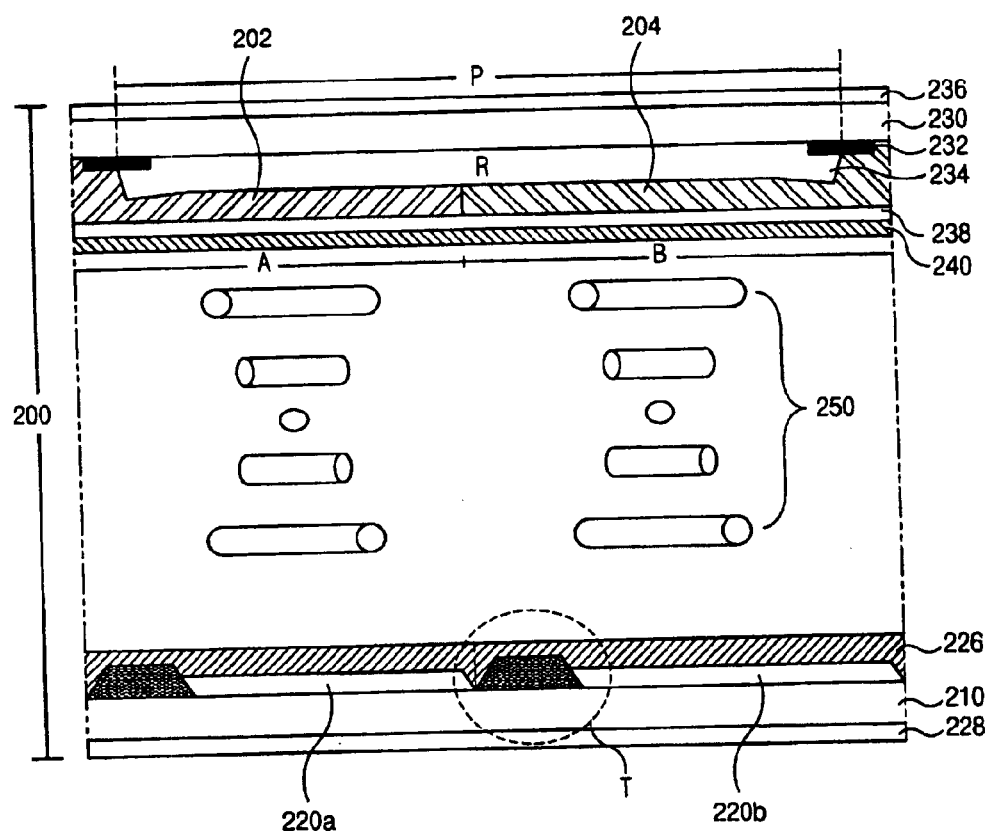
FIG. 7A is a cross sectional view of another exemplary liquid crystal display device according to the present invention.
Figure 7B:
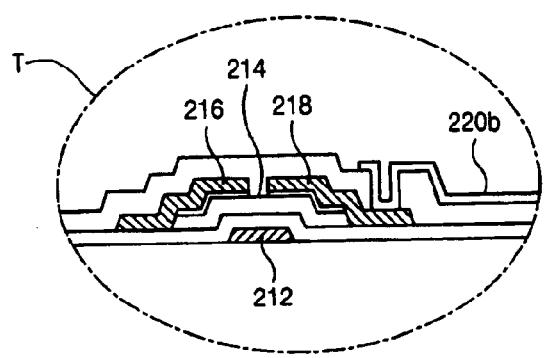
FIG. 7B is an enlarged cross sectional view of region "T" of FIG. 7A according to the present invention.

FIG. 7A is a cross sectional view of another exemplary liquid crystal display device according to the present invention, and FIG. 7B is an enlarged cross sectional view of region "T" of FIG. 7A according to the present invention. In FIG. 7A, a liquid crystal display panel 200 may include first and second substrates 210 and 230, and a liquid crystal layer 250 therebetween, wherein a plurality of pixel regions "P" may be defined on the liquid crystal display panel 200. In addition, first and second retardation layers 202 and 204 may be formed on the second substrate 230. The second substrate 230 may include a black matrix 232 disposed along a boundary region of each of the pixel regions "P" and a sub-color filter 234 corresponding to the pixel region "P."

A portion of the second substrate 230 corresponding to the pixel region "P" may be divided into first and second area "A" and "B," wherein the first and second retardation layers 202 and 204 may be provided within each region of the first and second areas "A" and "B," respectively. In addition, a common electrode 238 may be provided beneath the second substrate 230 and the first and second retardation layers 202 and 204, and a second alignment layer 240 may be formed beneath the common electrode 238. Although not shown, a plurality of gate and data lines crossing each other may be provided within each of the first and second areas "A" and "B". A thin film transistor "T" may be provided near each crossing point of the gate and data lines (not shown).

In FIG. 7B, the thin film transistor "T" may include a gate electrode 212, an active layer 214, a source electrode 216, and a drain electrode 218. The gate electrode 212 may be electrically connected to the gate line (not shown), and the active layer 214 may be formed over the gate electrode 212. The source electrode 216 may be electrically connected to the data line (not shown), and the drain electrode 218 may be spaced apart from the source electrode 216.

In FIG. 7A, first and second pixel electrodes 220a and 220b may be provided within the first and second areas "A" and "B," respectively, and may be electrically connected to the drain electrode 218 of the thin film transistors "T." In addition, a first alignment layer 226 may be provided on the first and second pixel electrodes 220a and 220b, and first and second linear polarizers 228 and 236 may be provided along outside surfaces of the first and second substrates 210 and 230, respectively. A polarizing axis of the first linear polarizer 228 may be perpendicular to a polarizing axis of the second linear polarizer 236. For example, the polarizing axis of the first linear polarizer 228 may have a polarizing angle of about 135° (degrees) and the polarizing axis of the second linear polarizer 236 may have a polarizing angle of about 45° (degrees). Accordingly, viewing angles may be improved by forming a normally-white mode region "A" and a normally-black mode region "B" within a single pixel region "P," thereby mutually compensating the luminance of the normally-white mode region "A" and the normally-black mode region "B".

Figure 8:
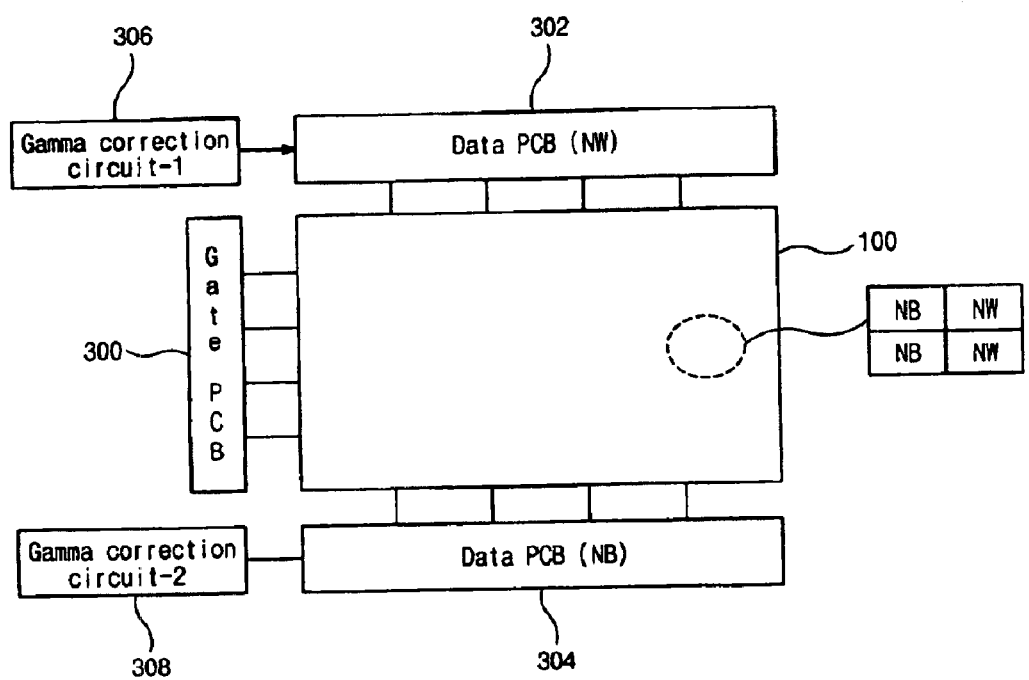
FIG. 8 is a schematic view of an exemplary liquid crystal display (LCD) device according to the present invention.

FIG. 8 is a schematic view of an exemplary liquid crystal display (LCD) device according to the present invention. The exemplary liquid crystal display panels of FIGS. 6 and 7 may require additional gamma correction circuitry for separate operation of the normally-white mode region and the normally-black mode region. In FIG. 8, a liquid crystal display panel 100 may be electrically connected to a gate print circuit board (PCB) 300 and first and second data PCBs 302 and 304. The gate PCB 300 may supply signals to gate lines, and the first and second data PCBs may supply signals to data lines. The first data PCB may drive normally-white mode regions (or normally black-mode regions), and the second data PCB may drive the normally-black mode regions (or the normally-white mode regions). In addition, a first gamma correction circuit 306 may be electrically connected to the first data PCB 302, and a second gamma correction circuit 308 may be electrically connected to the second data PCB 304.

When a data signal is input into a liquid crystal display (LCD) device including the liquid crystal display panel 100, the first and second gamma correction circuits 306 and 308 may provide actual voltage values for each region of the normally-white mode regions and the normally-black mode regions. The first and second gamma correction circuits 306 and 308 may be integrated into a unit circuit board.

It will be apparent to those skilled in the art that various modifications and variations can be made in the liquid crystal display device and method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
   a first substrate having at least one pixel region defined thereon and a black matrix along a boundary region of the pixel region;
   a common electrode beneath the first substrate upon which the black matrix is formed;
   a first alignment layer beneath the common electrode;
   a first linear polarizer along an outer side surface of the first substrate;
   a second substrate having at least one pixel portion corresponding to the pixel region of the first substrate, the pixel portion being divided into first and second areas;
   gate and data lines provided on both the first and second areas of the second substrate, the gate and data lines crossing each other;
   a first switching element provided at a cross point of the gate and data lines within the first area;
   a second switching element formed at a cross point of the gate and data lines within the second area;
   a first pixel electrode within the first area connected to the first switching element;
   a second pixel electrode within the second area connected to the second switching element;
   a first retardation layer having a first phase retardation value formed beneath the first pixel electrode;
   a second retardation layer having a second phase retardation value different from the first phase retardation value formed beneath the second pixel electrode;
   a second alignment layer provided on the first and second pixel electrodes;
   a liquid crystal layer disposed between the first and second alignment layers; and
   a second linear polarizer provided along an outer side surface of the second substrate.

2. The device according to claim 1, wherein the first and second switching elements include thin film transistors, each having a gate electrode, an active layer, a source electrode, and a drain electrode.

3. The device according to claim 1, wherein the liquid crystal layer includes twisted nematic mode liquid crystal material.

4. The device according to claim 3, wherein the first area is one of a normally-white mode region and a normally-black mode region, and the second area is one of a normally-black mode region and a normally-white mode region.

5. The device according to claim 1, wherein the first phase retardation value is about zero and the second phase retardation value is about λ/2.

6. The device according to claim 5, wherein the first area corresponding to the first retardation layer is a normally-white mode region and the second area corresponding to the second retardation layer is a normally-black mode region.

7. The device according to claim 1, wherein the liquid crystal layer includes electrically controlled birefringence mode liquid crystal material.

8. The device according to claim 7, wherein the first phase retardation value is between about 20 nm and about 50 nm and the second phase retardation value is about λ/2.

9. The device according to claim 1, wherein a polarizing axis of the first linear polarizer is perpendicular to a polarizing axis of the second linear polarizer.

10. The device according to claim 1, further comprising a gate printed circuit board connected to the gate lines, and first and second data printed circuit boards connected to the data lines.

11. The device according to claim 10, wherein the first data printed circuit board supplies a signal to one of the first and second areas, and the second data printed circuit board supplies a signal to one of the second and first areas.

12. The device according to claim 11, further comprising a first gamma correction circuit electrically connected to the first data printed circuit board, and a second gamma correction circuit electrically connected to the second data printed circuit board.

13. A liquid crystal display (LCD) device, comprising:
   a first substrate having at least one pixel region defined thereon and a black matrix along a boundary region of the pixel region;
   first and second retardation layers beneath the first substrate, the first and second retardation layers each having different phase retardation values;
   a common electrode beneath the first and second retardation layers;
   a first alignment layer beneath the common electrode;
   a first linear polarizer along an outer side surface of the first substrate;
   a second substrate having a pixel portion corresponding to the pixel region of the first substrate, the pixel portion divided into first and second areas, the first area corresponding to the first retardation layer and the second area corresponding to the second retardation layer;
   gate and data lines provided on the first and second areas of the second substrate;
   first and second switching elements provided at crossing points of the gate and data lines of the first and second areas;
   first and second pixel electrodes on the second substrate, the first pixel electrode connected to the first switching element and the second pixel electrode connected to the second switching element;
   a second alignment layer on the first and second pixel electrodes;
   a liquid crystal layer disposed between the first and second alignment layers; and
   a second linear polarizer provided along an outer side surface of the second substrate.

14. The device according to claim 13, wherein the first and second switching elements include thin film transistors, each having a gate electrode, an active layer, a source electrode, and a drain electrode.

15. The device according to claim 13, wherein the liquid crystal layer includes twisted nematic mode liquid crystal material.

16. The device according to claim 15, wherein the first area is one of a normally-white mode region and a normally-black mode region, and the second area is one of a normally-black mode region and a normally-white mode region.

17. The device according to claim 13, wherein a phase retardation value of the first retardation layer is about zero and a phase retardation value of the second retardation layer is about λ/2.

18. The device according to claim 17, wherein the first area corresponding to the first retardation layer is a normally-white mode region and the second area corresponding to the second retardation layer is a normally-black mode region.

19. The device according to claim 13, wherein the liquid crystal layer includes electrically controlled birefringence mode liquid crystal material.

20. The device according to claim 19, wherein a phase retardation value of the first retardation layer is between about 20 nm and about 50 nm and a phase retardation value of the second retardation layer is about λ/2.

21. The device according to claim 13, wherein a polarizing axis of the first linear polarizer is perpendicular to a polarizing axis of the second linear polarizer.

22. The device according to claim 13, further comprising a gate printed circuit board connected to the gate lines, and first and second data printed circuit boards connected to the data lines.

23. The device according to claim 22, wherein the first data printed circuit board supplies a signal to one of the first and second areas and the second data printed circuit board supplies a signal to one of the second and first areas.

24. The device according to claim 23, further comprising a first gamma correction circuit electrically connected to the first data printed circuit board, and a second gamma correction circuit electrically connected to the second data printed circuit board.

25. A method of fabricating a liquid crystal display (LCD) device, comprising:
forming a black matrix on a first substrate along a boundary region of at least one pixel region defined thereon;
forming a common electrode beneath the first substrate upon which the black matrix is formed;
forming a first alignment layer beneath the common electrode;
forming a first linear polarizer along an outer side surface of the first substrate;
providing a second substrate having at least one pixel portion corresponding to the pixel region of the first substrate, the pixel portion being divided into first and second areas;
forming gate and data lines on both the first and second areas of the second substrate, the gate and data lines crossing each other;
forming a first switching element at a cross point of the gate and data lines within the first area;
forming a second switching element at a cross point of the gate and data lines within the second area;
forming a first pixel electrode within the first area to be connected to the first switching element;
forming a second pixel electrode within the second area to be connected to the second switching element;
forming a first retardation layer having a first phase retardation value beneath the first pixel electrode;
forming a second retardation layer having a second phase retardation value different from the first phase retardation value beneath the second pixel electrode;
forming a second alignment layer on the first and second pixel electrodes;
providing a liquid crystal layer disposed between the first and second alignment layers; and
forming a second linear polarizer along an outer side surface of the second substrate.

26. The method according to claim 25, wherein the first and second switching elements include thin film transistors, each having a gate electrode, an active layer, a source electrode, and a drain electrode.

27. The method according to claim 25, wherein the liquid crystal layer includes twisted nematic mode liquid crystal material.

28. The method according to claim 25, wherein the first area is one of a normally-white mode region and a normally-black mode region, and the second area is one of a normally-black mode region and a normally-white mode region.

29. The method according to claim 25, wherein the first phase retardation value is about zero and the second phase retardation value is about λ/2.

30. The method according to claim 29, wherein the first area corresponding to the first retardation layer is a normally-white mode region and the second area corresponding to the second retardation layer is a normally-black mode region.

31. The method according to claim 25, wherein the liquid crystal layer includes electrically controlled birefringence mode liquid crystal material.

32. The method according to claim 31, wherein the first phase retardation value is between about 20 nm and about 50 nm and the second phase retardation value is about λ/2.

33. The method according to claim 25, wherein a polarizing axis of the first linear polarizer is perpendicular to a polarizing axis of the second linear polarizer.

34. A method of fabricating a liquid crystal display (LCD) device, comprising:
forming a black matrix on a first substrate along a boundary region of at least one pixel region;
forming first and second retardation layers beneath the first substrate, the first and second retardation layers each having different phase retardation values;
forming a common electrode beneath the first and second retardation layers;
forming a first alignment layer beneath the common electrode;
forming a first linear polarizer along an outer side surface of the first substrate;
providing a second substrate having a pixel portion corresponding to the pixel region of the first substrate, the pixel portion divided into first and second areas, the first area corresponding to the first retardation layer and the second area corresponding to the second retardation layer;
forming gate and data lines on the first and second areas of the second substrate;
forming first and second switching elements at crossing points of the gate and data lines of the first and second areas;
forming first and second pixel electrodes on the second substrate, the first pixel electrode connected to the first switching element and the second pixel electrode connected to the second switching element;
forming a second alignment layer on the first and second pixel electrodes;
providing a liquid crystal layer between the first and second alignment layers; and
forming a second linear polarizer along an outer side surface of the second substrate.

35. The method according to claim 34, wherein the first and second switching elements include thin film transistors, each having a gate electrode, an active layer, a source electrode, and a drain electrode.

36. The method according to claim 34, wherein the liquid crystal layer includes twisted nematic mode liquid crystal material.

37. The method according to claim 34, wherein the first area is one of a normally-white mode region and a normally-black mode region, and the second area is one of a normally-black mode region and a normally-white mode region.

38. The method according to claim 34, wherein a phase retardation value of the first retardation layer is about zero and a phase retardation value of the second retardation layer is about $\lambda/2$.

39. The method according to claim 34, wherein the first area corresponding to the first retardation layer is a normally-white mode region and the second area corresponding to the second retardation layer is a normally-black mode region.

40. The method according to claim 34, wherein the liquid crystal layer includes electrically controlled birefringence mode liquid crystal material.

41. The method according to claim 40, wherein a phase retardation value of the first retardation layer is between about 20 nm and about 50 nm and a phase retardation value of the second retardation layer is about $\lambda/2$.

42. The method according to claim 34, wherein a polarizing axis of the first linear polarizer is perpendicular to a polarizing axis of the second linear polarizer.

* * * * *